(12) United States Patent
Jackson (10) Patent No.: US 10,874,215 B2
(45) Date of Patent: Dec. 29, 2020

(54) SWIVEL SHELVING SYSTEM

(71) Applicant: John Jackson, Casa Grande, AZ (US)

(72) Inventor: John Jackson, Casa Grande, AZ (US)

( * ) Notice: Subject to any disclaimer, the term of this patent is extended or adjusted under 35 U.S.C. 154(b) by 187 days.

(21) Appl. No.: 16/172,525

(22) Filed: Oct. 26, 2018

(65) Prior Publication Data

US 2019/0231067 A1 Aug. 1, 2019

Related U.S. Application Data

(60) Provisional application No. 62/577,621, filed on Oct. 26, 2017.

(51) Int. Cl.
*A47B 96/02* (2006.01)
*A47B 96/06* (2006.01)
*A01K 1/03* (2006.01)
*A01K 1/035* (2006.01)

(52) U.S. Cl.
CPC ............ *A47B 96/022* (2013.01); *A01K 1/035* (2013.01); *A47B 96/025* (2013.01); *A47B 96/06* (2013.01)

(58) Field of Classification Search
CPC . A47B 81/00; A47B 81/002; A47B 2063/005; A47B 96/02; A47B 96/022; A47B 96/024; A47B 96/025; A47B 96/06; A01K 1/035
See application file for complete search history.

(56) References Cited

U.S. PATENT DOCUMENTS

| | | | | |
|---|---|---|---|---|
| 318,200 A * | 5/1885 | O'Neill | ................. | A47B 96/02 108/42 |
| 323,525 A * | 8/1885 | Perry | ..................... | A47B 96/02 108/42 |
| 523,679 A * | 7/1894 | McLenathan | .......... | A47B 96/02 108/42 |
| 553,418 A * | 1/1896 | Meijer | ................... | A47B 96/02 108/42 |
| 1,497,694 A * | 6/1924 | Neff, Sr. | ................... | A47L 3/00 49/55 |
| 3,482,910 A * | 12/1969 | Debelius | ................ | G03B 21/64 353/42 |
| 4,869,451 A * | 9/1989 | Gordon | .................. | A47H 27/00 248/235 |
| 2008/0134430 A1* | 6/2008 | Kirmon | .................. | A01K 1/035 5/10.1 |

FOREIGN PATENT DOCUMENTS

| | | | | |
|---|---|---|---|---|
| DE | 3101602 A1 * | 9/1982 | ............. | A47H 27/00 |
| EP | 0152792 A2 * | 8/1985 | ............. | A47H 27/00 |
| WO | WO-9629911 A1 * | 10/1996 | ........... | A47B 96/022 |

* cited by examiner

*Primary Examiner* — Andrew M Roersma
(74) *Attorney, Agent, or Firm* — Schmeiser, Olsen & Watts LLP (57) ABSTRACT

A swivel shelving system is provided. The swivel shelving system includes a mounting bracket coupled to a corner between a wall and a window, a support arm rotatably coupled to the mounting bracket, and a shelving assembly rotatably coupled to the support arm. The shelving assembly is rotatable between a first position adjacent a window and a second position adjacent a wall. Further, the shelving assembly may include a vertical support coupled directly to the shelf and in other embodiments, the shelving assembly may be a vertical support coupled to a shelf support and the shelf support coupled to and supporting the shelf.

16 Claims, 15 Drawing Sheets

SWIVEL SHELVING SYSTEM

CROSS REFERENCE TO RELATED APPLICATION[S]

This application claims priority to U.S. Provisional Patent Application entitled "Swivel Shelving System," Ser. No. 62/577,621, filed Oct. 26, 2017, the disclosure of which is hereby incorporated entirely herein by reference.

BACKGROUND OF THE INVENTION

Technical Field

This invention relates generally to shelving system and more particularly to a corner mounted swivel shelving system.

State of the Art

People utilize shelving systems for various purposes. Some such shelves are utilized to hold books, flowers, and the like. These shelves may be standard shelves that are floor supported shelving units. Other shelves may be mounted to a flat wall surface. Additionally, shelves may be mounted to inner corners. The shelving systems are static and provide for no movability of the shelves.

Accordingly, there is a need for a shelving system that allows for movement of the shelves.

SUMMARY OF THE INVENTION

The present invention relates to a swivel shelving system that may be mounted on an outer corner allowing the shelves of the system to be rotated between at least two positions.

An embodiment includes a swivel shelving system comprising a mounting bracket coupled to a corner between a wall and a window; a support arm rotatbly coupled to the mounting bracket; and a shelving assembly rotatably coupled to the support arm, wherein the shelving assembly is rotatable between a first position adjacent a window and a second position adjacent a wall.

The shelving assembly may comprise a vertical support coupled directly to the shelf and in other embodiments, the shelving assembly may comprise a vertical support coupled to a shelf support and the shelf support coupled to and supporting the shelf.

An embodiment includes a swivel shelving system comprising: a mounting bracket coupled to a corner between a wall and a window; a support arm rotatbly coupled to the mounting bracket; and a shelving assembly comprising a vertical support and at least one shelf coupled to the vertical support, therein the vertical support is rotatably coupled to the support arm, wherein the shelving assembly is rotatable between a first position adjacent a window and a second position adjacent a wall.

Another embodiment includes a swivel shelving system comprising: a mounting bracket coupled to a corner between a wall and a window, the mounting bracket is configured to couple to a corner between the wall and the window on a right side or a left side of the window; a support arm rotatbly coupled to the mounting bracket, the support arm comprising a base portion and a telescopic portion, wherein the telescopic portion slides over an end of the base portion opposing an end coupled to mounting bracket; and a shelving assembly comprising a vertical support and a plurality of shelves coupled to the vertical support, therein the vertical support is coupled to the support arm, wherein the plurality of shelves are independently rotatable between a first position adjacent a window and a second position adjacent a wall, wherein the telescopic portion of the support arm is slid over the base portion and secured in place with the shelf oriented up when the mounting bracket is coupled on a right side or a left side of the window.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a swivel shelving system that may be mounted on an outer corner allowing the shelves of the system to be rotated between at least two positions.

Referring to the drawings, FIGS. 1-6 depict various views of a mounting bracket 20. The mounting bracket may include an L-shaped mounting plate 22 having mounting apertures 24 and 26 for receiving mounting screws there through. Mounting screws may be screwed into a wall surface at an outer corner through the mounting aperture to secure the bracket 20 to the wall. The location of the apertures 24 and 26 are specific to account for typical stud locations of a corner, particularly for a corner of a window opening.

The mounting bracket 20 may include support arm bracket members 30 having an opening 28 extending between the support arm bracket members 30. Each support arm bracket member 30 may include an aperture 34, wherein the apertures 34 of the support arm bracket members 30 receive a bolt or the like there through to rotatably couple a support arm 40 (see FIGS. 7-12) within the opening 28 between the support arm bracket members 30. The mounting bracket 20 may also include an additional support arm bracket member 32 for other support arm mounting purposes.

Figure 1:
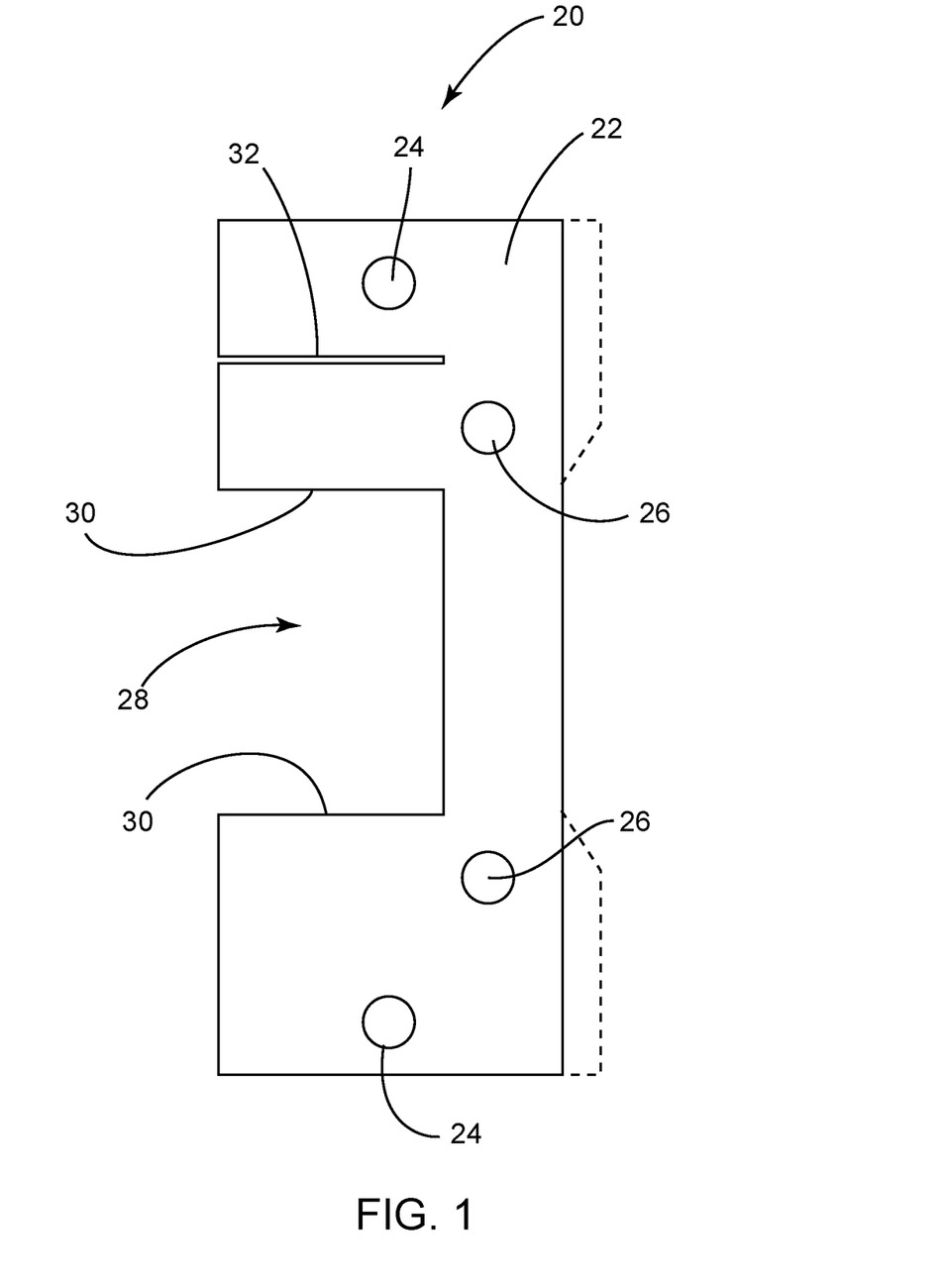
FIG. 1 is a front view of a mounting bracket of swivel shelving system in accordance with embodiments.
Figures 2, 3:
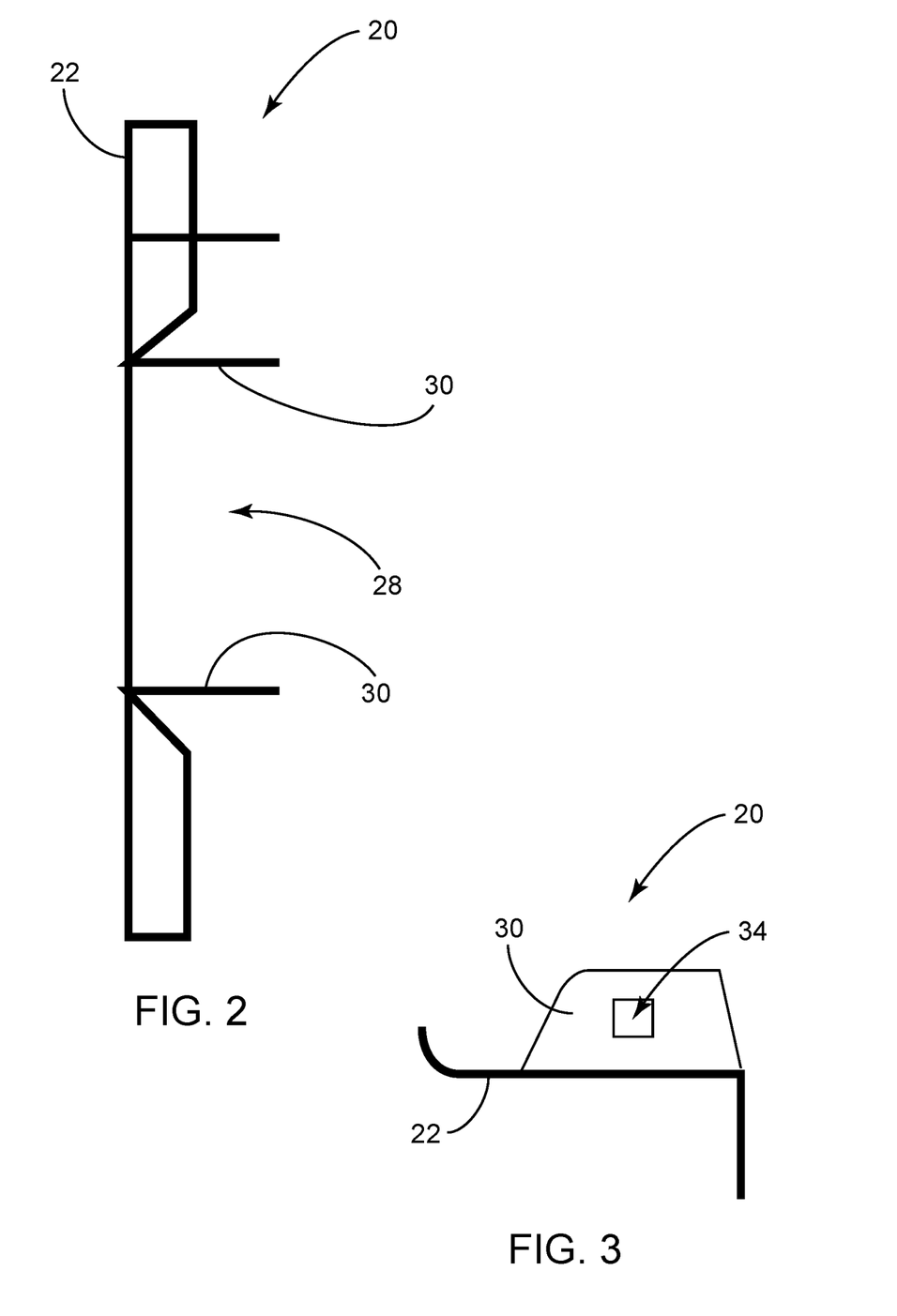
FIG. 2 is a side view of a mounting bracket of swivel shelving system in accordance with embodiments.
FIG. 3 is an end view of a mounting bracket of swivel shelving system in accordance with embodiments.
Figures 4, 5:
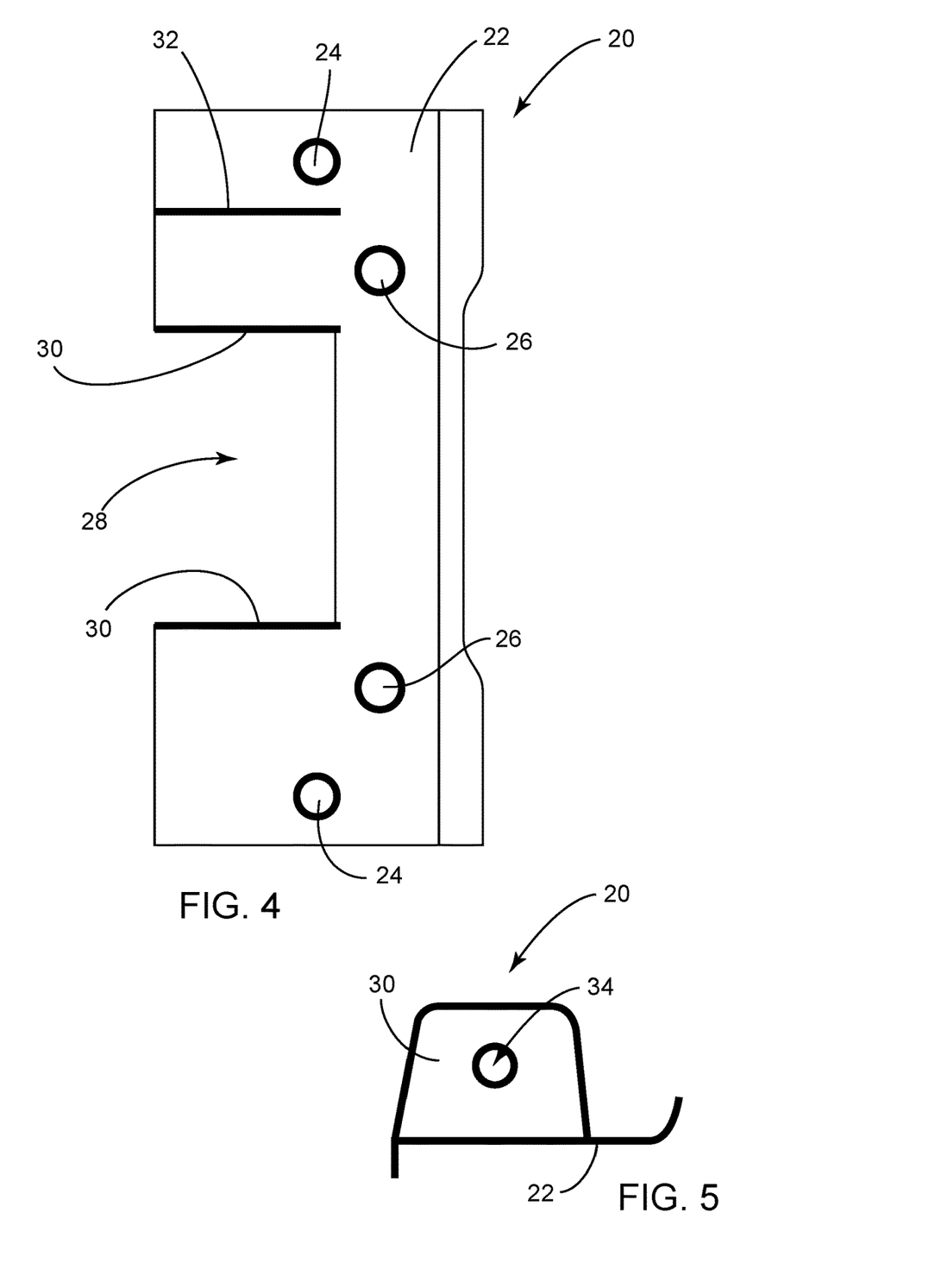
FIG. 4 is another side view of a mounting bracket of swivel shelving system in accordance with embodiments.
FIG. 5 is an end view of a mounting bracket of swivel shelving system in accordance with embodiments.
Figure 6:
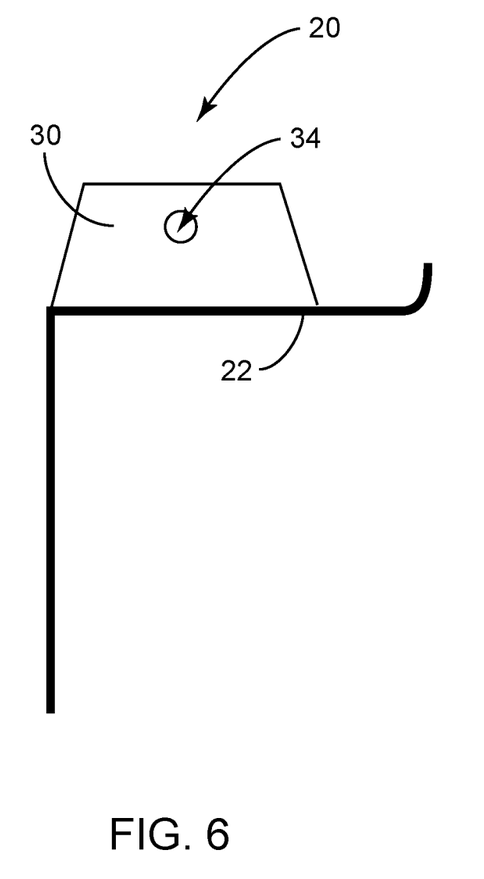
FIG. 6 is another end view of a mounting bracket of swivel shelving system in accordance with embodiments.
Figure 7:
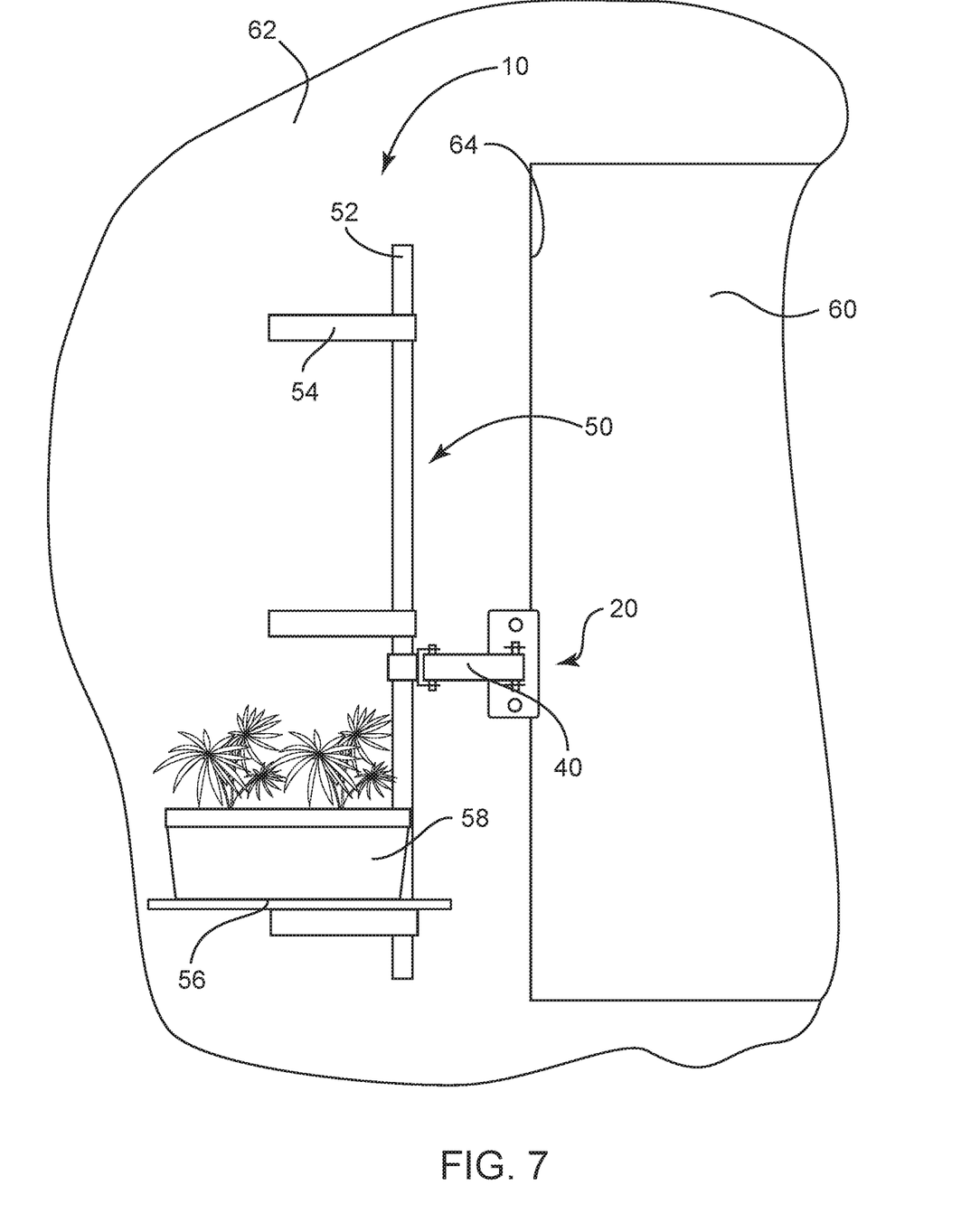
FIG. 7 is a perspective view of a swivel shelving system for plants in accordance with embodiments.
Figure 8:
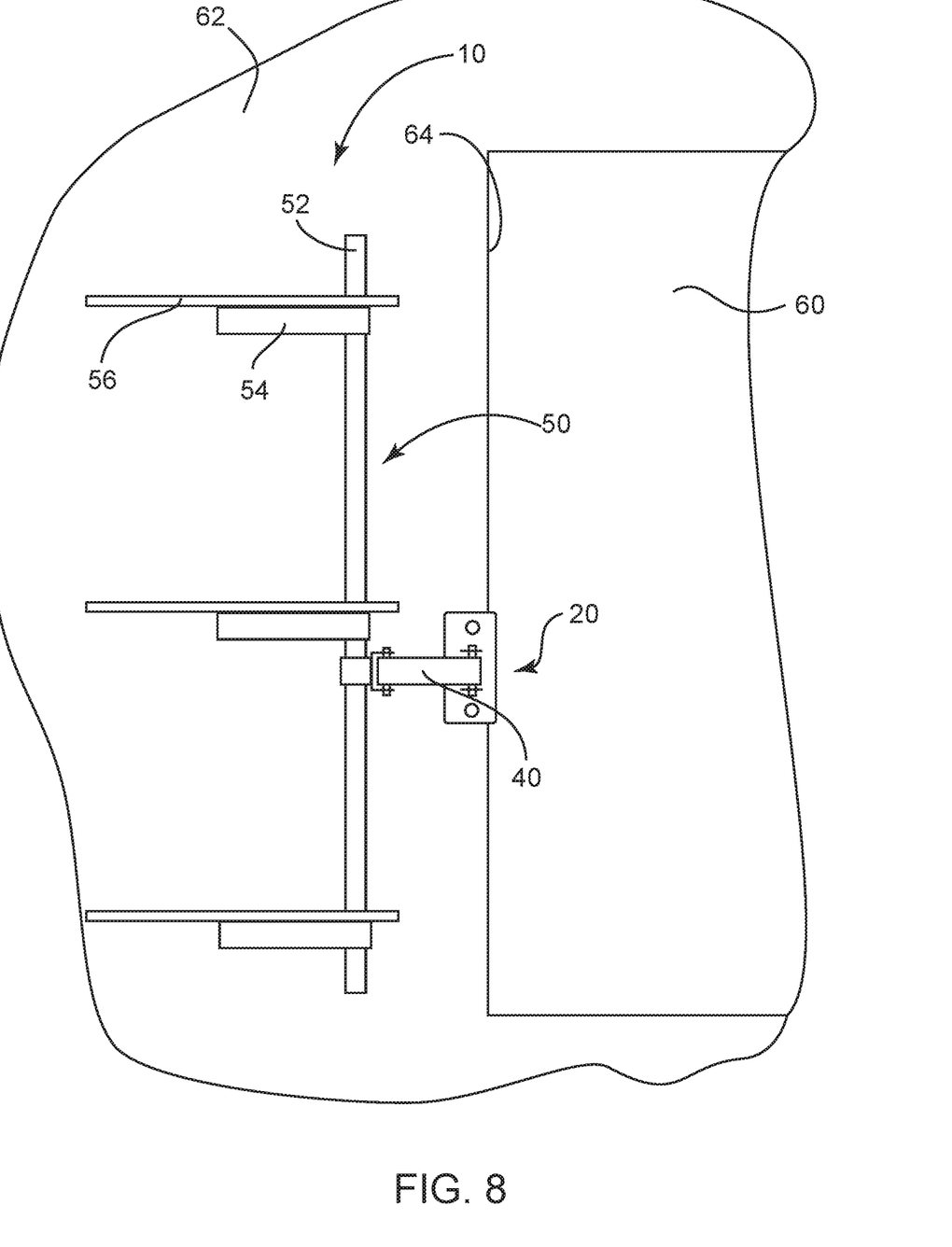
FIG. 8 is another perspective view of a swivel shelving system for plants in accordance with embodiments.
Figure 9:
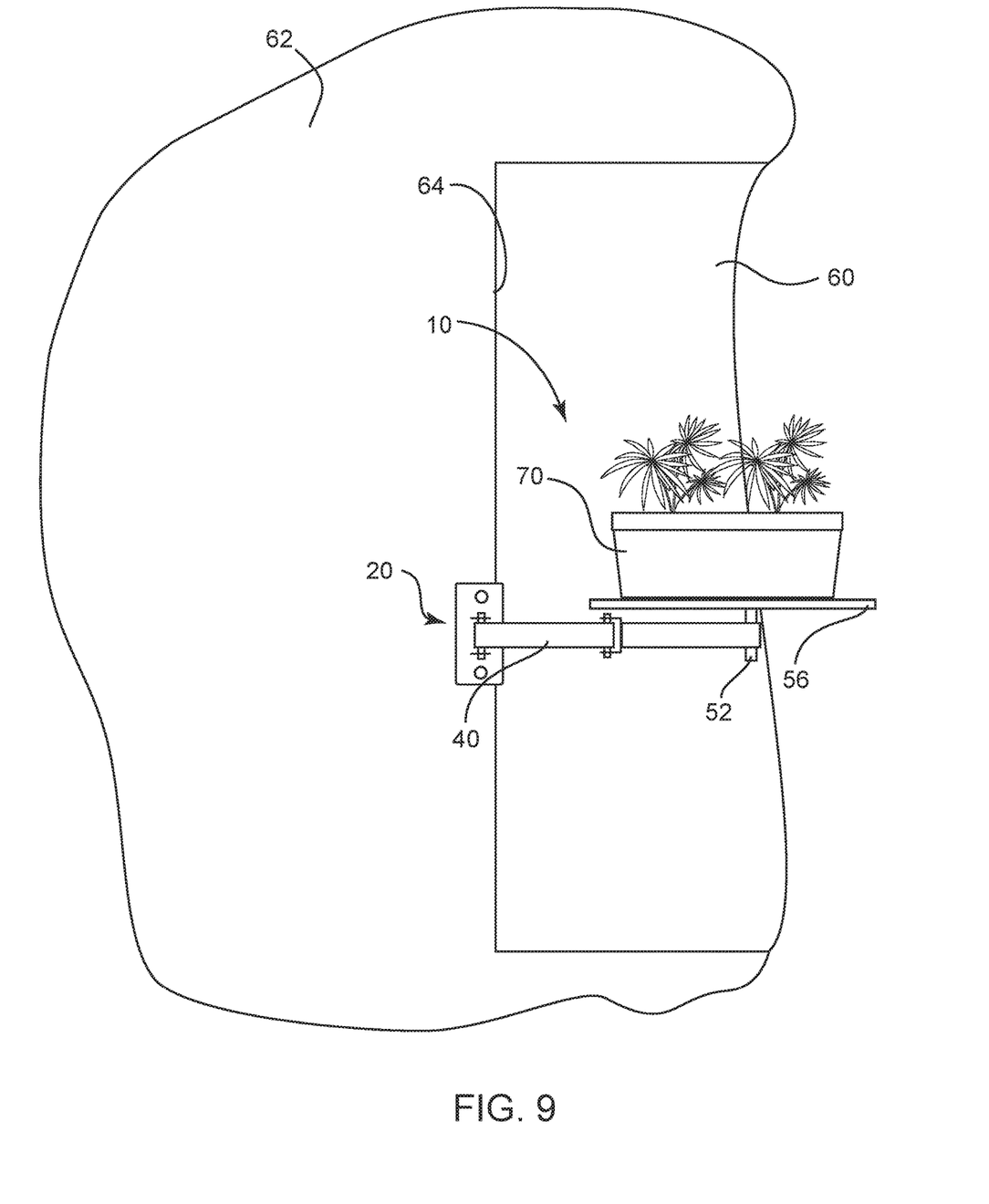
FIG. 9 is a perspective view of a swivel shelving system for plants in accordance with embodiments.
Figure 13:
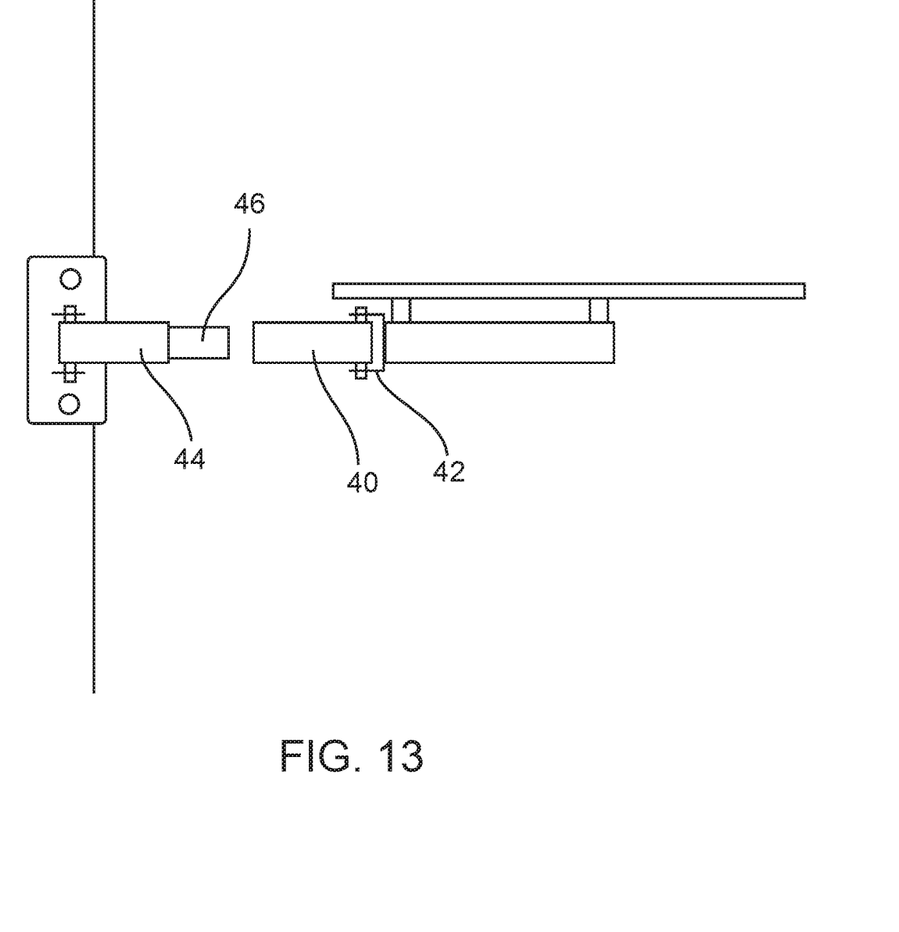
FIG. 13 is a perspective view of a support arm of a swivel shelving system in accordance with embodiments.

Referring further to the drawings, FIG. 7-9 depicts a swivel shelving system 10 in accordance with embodiments for use with plants 58. The system 10 includes a mounting bracket 20 coupled to a corner 64 formed between a wall 62 and a window 60. A support arm 40 is rotatably coupled to the mounting bracket 20 on one end of the support arm 40. With additional reference to FIG. 13, the opposing end of the support arm 40 includes a rotatable bracket 42 and telescopic members 44 and 46 to adjust a length of the support arm 40. The rotatable bracket 42 is configured to removably receive and retain a shelving assembly 50 coupled to the rotatable bracket 42. This allows the mounting bracket 20 to be coupled to a corner 64 on a right or left side of the window 60 and then orient the shelving assembly in a proper direction and couple it to the rotatable bracket 42 in the proper orientation with a shelf 56 facing up for supporting an accessory.

The shelving assembly 50 may include a vertical support 52 coupled to a shelf 56. In some embodiments, the vertical support 52 is coupled directly to the shelf 56 and in other embodiments, the vertical support 52 is coupled to a shelf support 54 and the shelf support is coupled to and supports the shelf 56. The support arm 40 provides for two points of rotation, one at the mounting bracket 20 and the other at the rotatable bracket 42 on an opposing end from the mounting bracket 20. This allows for various configurations of the shelves 56. In one position, the shelves 56 may be swiveled or rotated to be adjacent the window 60, wherein a plant 58 supported by the shelf 56 may be in a position to receive direct sunlight. In another position, the shelves 56 may be swiveled or rotated adjacent the wall 62 in order to move the shelf 56 away from the window and allows for non-obstruction to operation of any window covering. Further still, in another position, the shelves 56 may be swiveled or rotated in a position between adjacent the window 60 and adjacent the wall 62. This allows a user to position the shelves in a position desired by the user. In some embodiments, the vertical support 52 may be sufficient to couple one shelf to the support arm 40. In other embodiments, the vertical support 52 may be sufficient to couple more than one shelf to the support arm 40.

Figure 10:
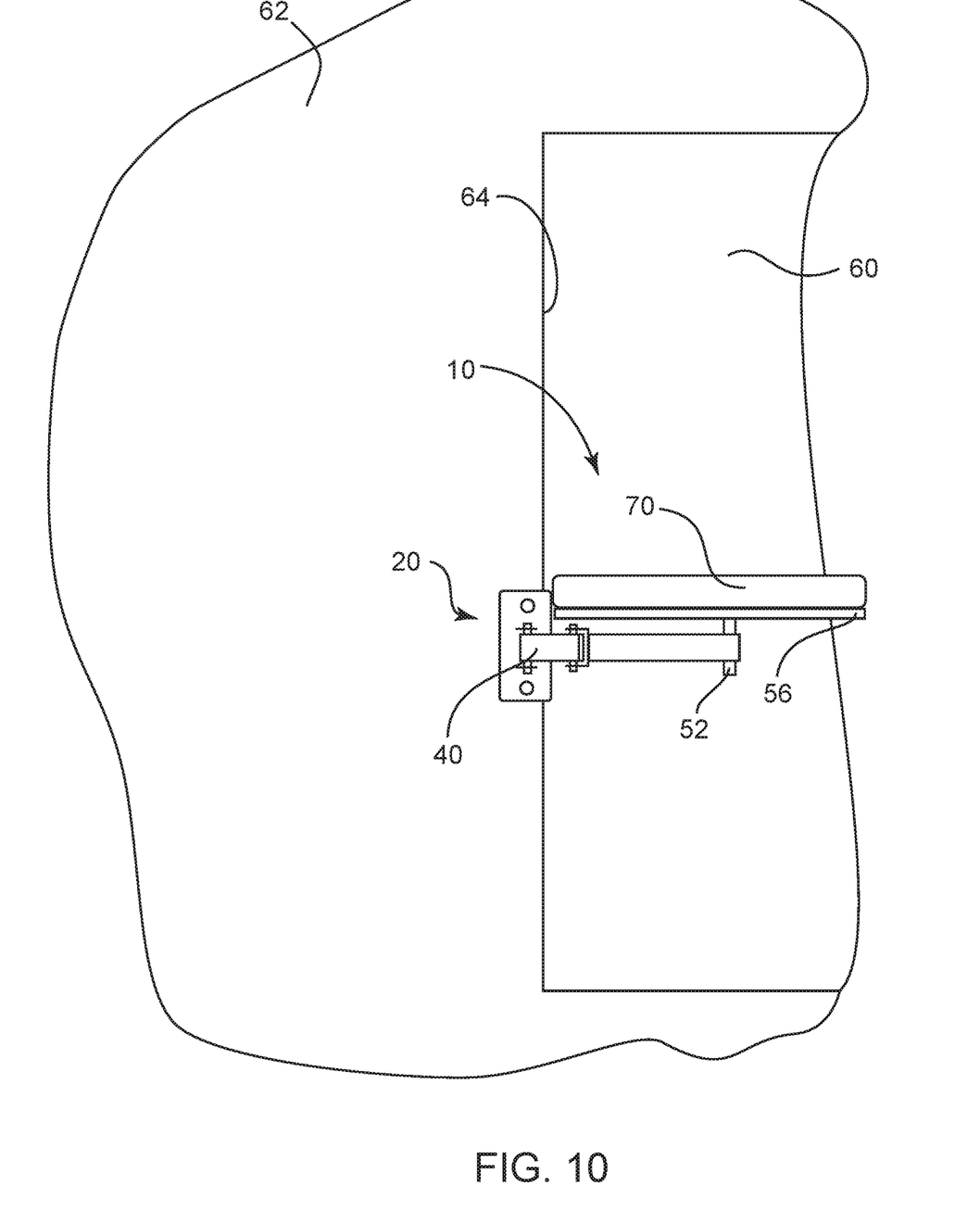
FIG. 10 is a perspective view of a swivel shelving system for a cat bed in accordance with embodiments.
Figure 11:
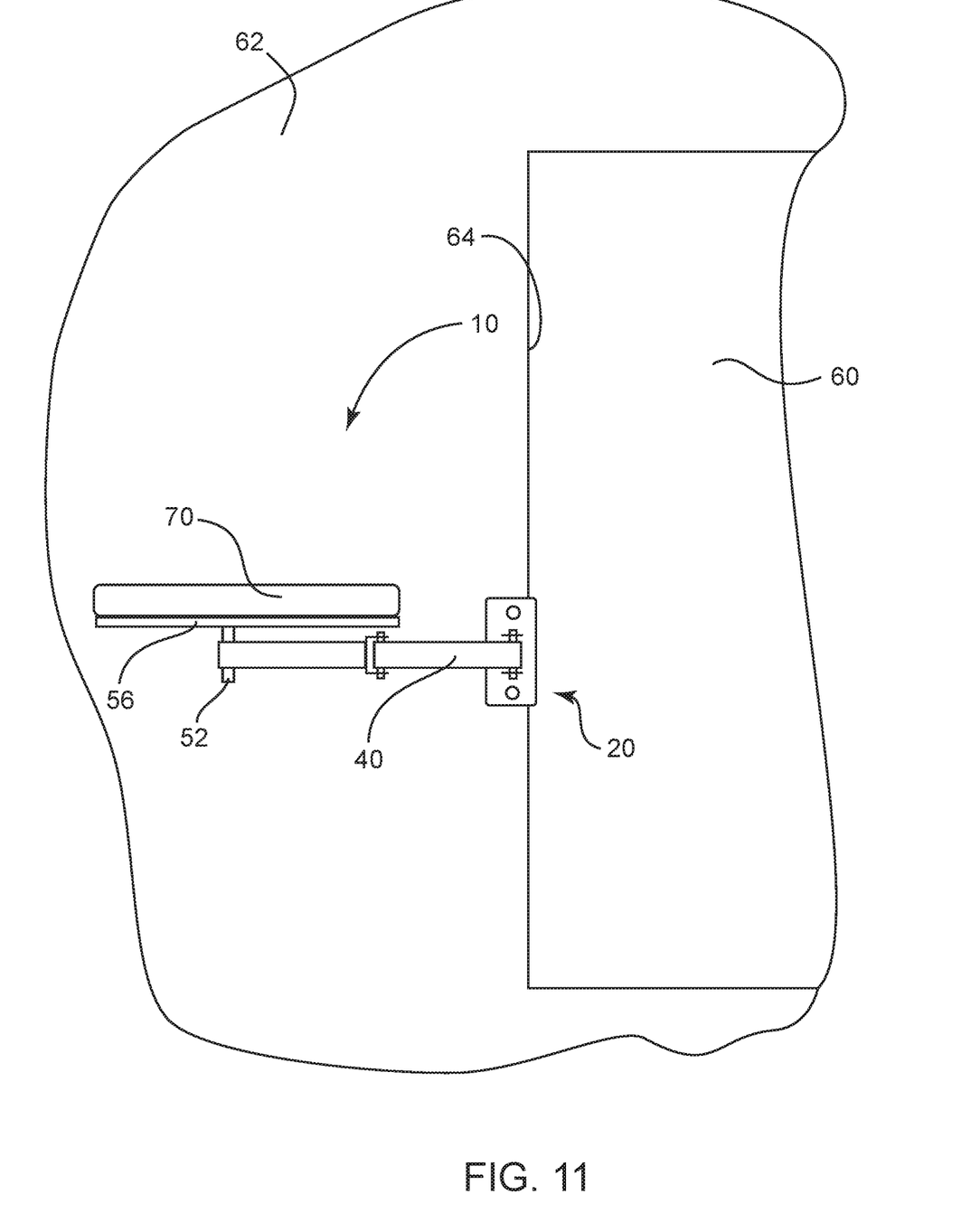
FIG. 11 is another perspective view of a swivel shelving system for a cat bed in accordance with embodiments.
Figure 12:
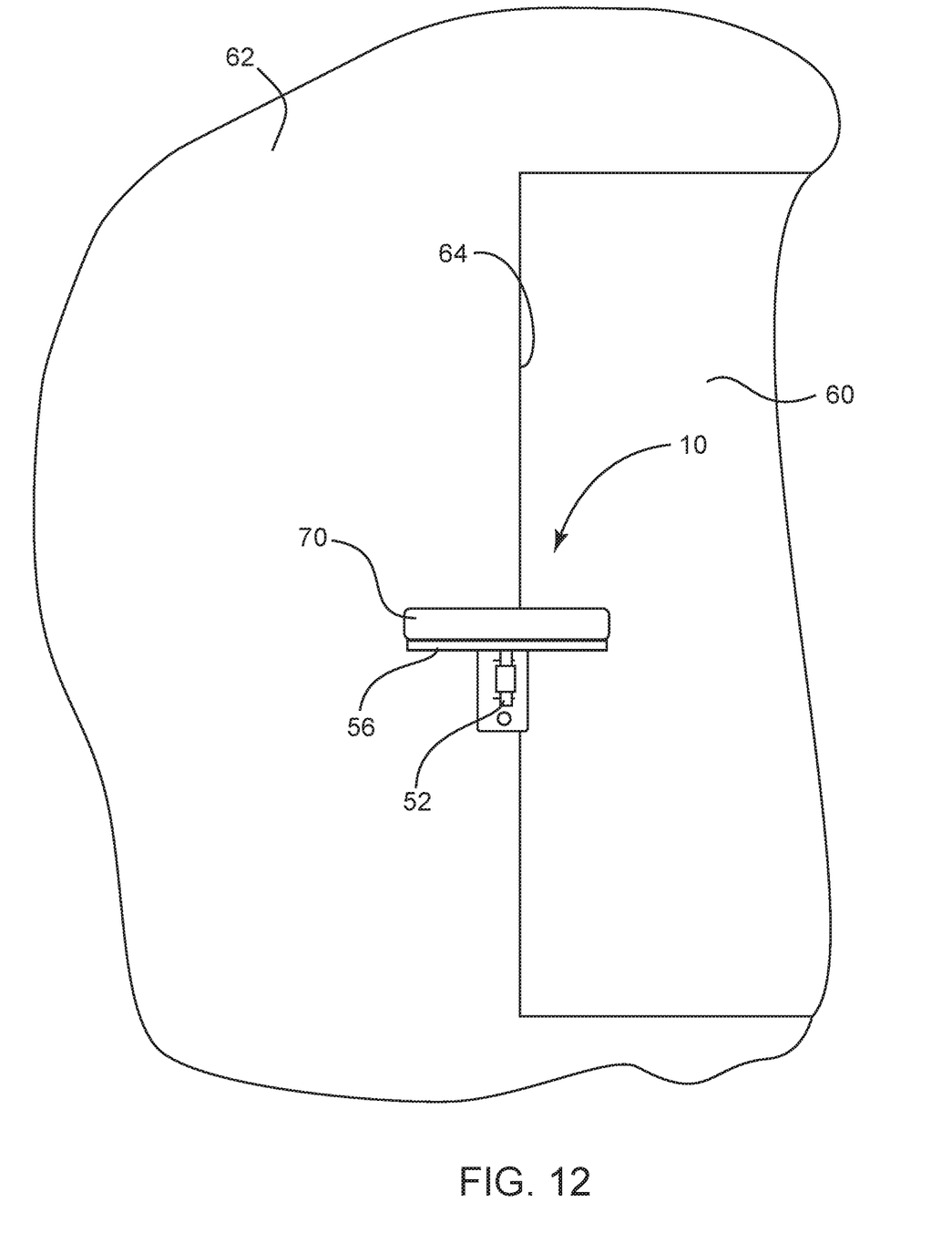
FIG. 12 is a perspective view of a swivel shelving system for a cat bed in accordance with embodiments.

Referring further to the drawings, FIG. 10-12 depicts a swivel shelving system 10 in accordance with embodiments for use with cat beds 70. The system 10 includes a mounting bracket 20 coupled to a corner 64 formed between a wall 62 and a window 60. A support arm 40 is rotatably coupled to the mounting bracket 20 on one end of the support arm 40. With additional reference to FIG. 13, the opposing end of the support arm 40 includes a rotatable bracket 42 and telescopic member 44 and base portion 46 of support arm 40 to adjust the support arm 40 for mounting to the mounting bracket 20 coupled to either a right corner or a left corner of a window opening. The rotatable bracket 42 is configured to removably receive and retain a shelving assembly 50 coupled to the rotatable bracket 42.

Figure 14:
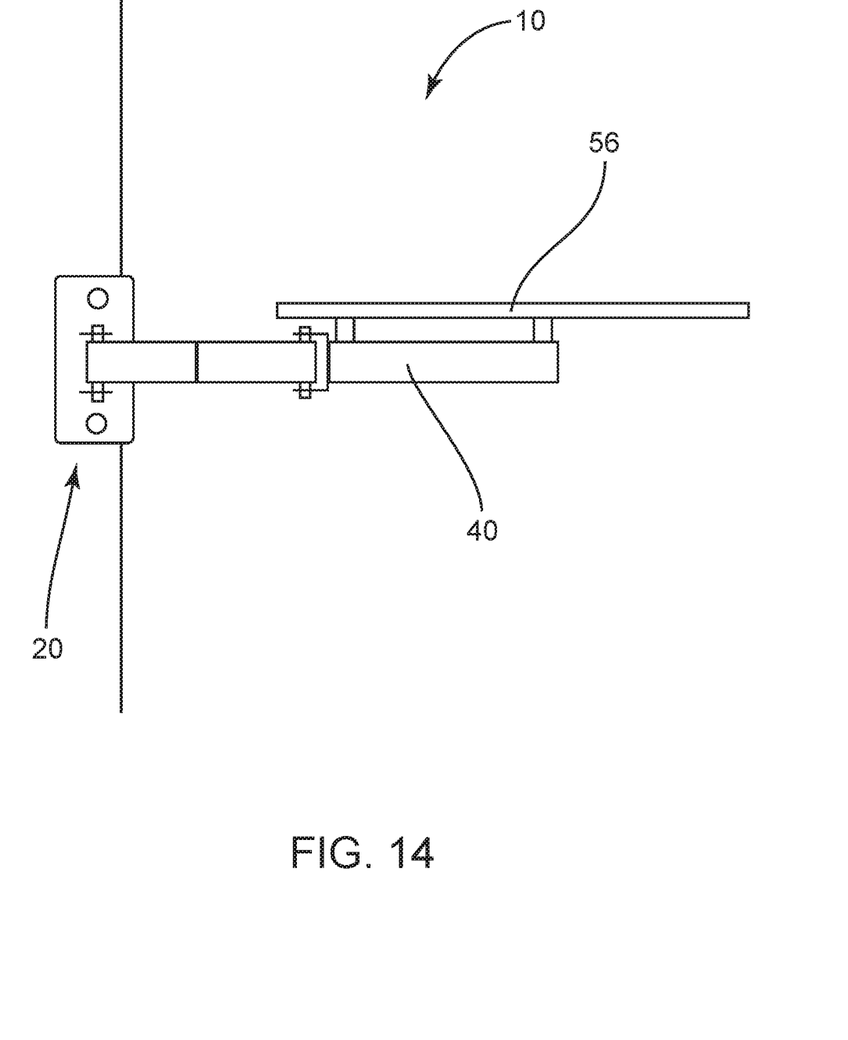
FIG. 14 is a perspective view of a swivel shelving system in accordance with embodiments.
Figure 15:
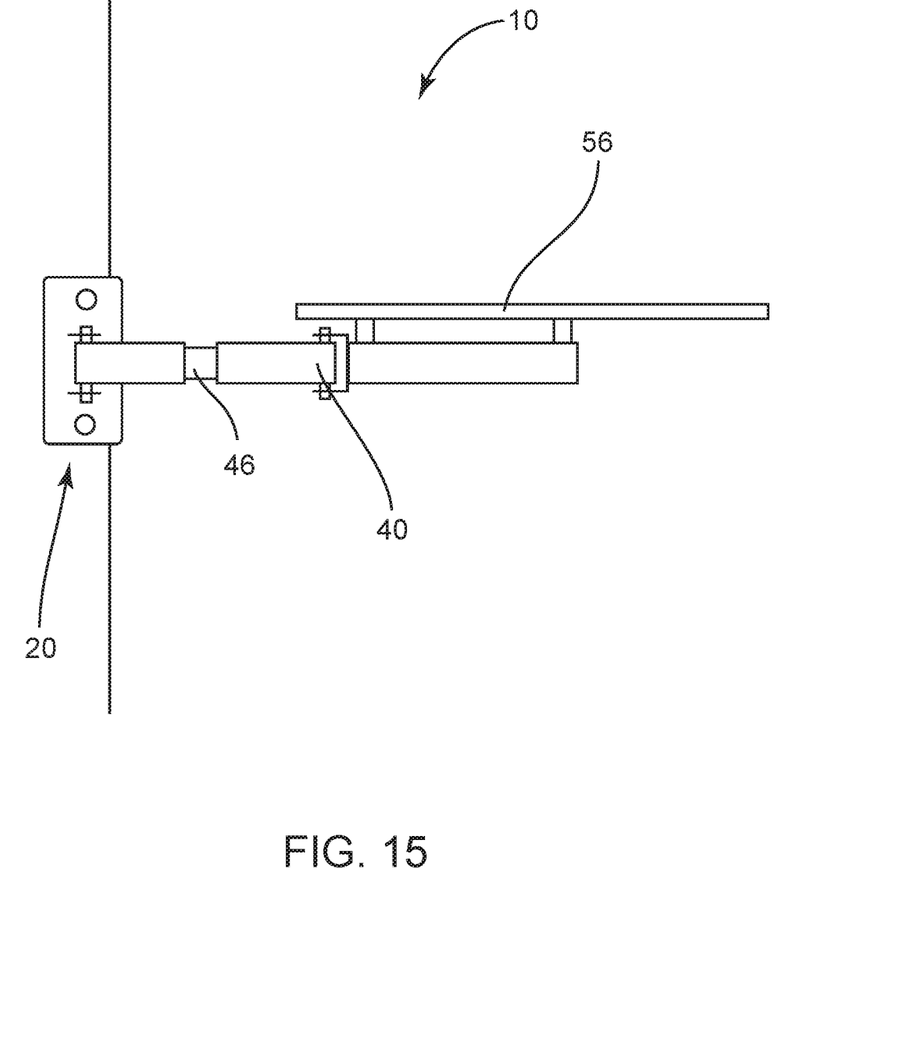
FIG. 15 is a perspective view of a support arm separating from a base portion of a support arm of a swivel shelving system in accordance with embodiments.
Figure 16:
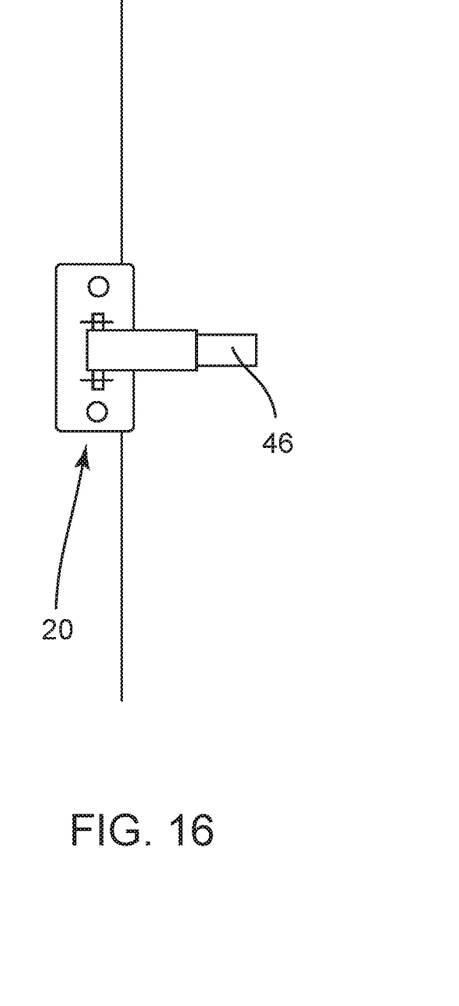
FIG. 16 is a perspective view of a base portion of a support arm of a swivel shelving system in accordance with embodiments.

As shown in FIGS. 14-16, the support arm 40 may include a base portion 46 and a telescopic portion 44, wherein the telescopic portion 44 can slide over an end of base portion 46 opposing the end coupled to mounting bracket 20. The telescopic portion 44 may then be releasably secured to the base portion 46. This allows the mounting bracket 20 to be coupled to a corner 64 on a right or left side of the window 60 and then orient the shelving assembly in a proper direction by coupling the telescopic portion 44 with the shelf oriented the proper direction with a shelf 56 facing up for supporting an accessory. The base portion 46 may include an end with a reduced perimeter that corresponds to the inner perimeter measurement of the telescopic portion 44 so as to slide within the telescopic portion 44. In some embodiments, a securing device may be used to secure the telescopic portion 44 to the base portion 46 and in other embodiments, a friction fit between the telescopic portion 44 and the base portion 46 operates to secure the telescopic portion 44 to the base portion 46. This allows the bracket 20 to be mounted on a right or left side of a window, and then the telescopic portion 44 may be slid over the base portion 46 and secured in place with the shelf 56 oriented in the proper direction.

The shelving assembly 50 may include a vertical support 52 coupled to a shelf 56. In some embodiments, the vertical support 52 is coupled directly to the shelf 56 and in other embodiments, the vertical support 52 is coupled to a shelf support 54 and the shelf support is coupled to and supports the shelf 56. The support arm 40 provides for two points of rotation, one at the mounting bracket 20 and the other at the rotatable bracket 42 on an opposing end from the mounting bracket 20. This allows for various configurations of the shelves 56. In one position, the shelves 56 may be swiveled or rotated to be adjacent the window 60, wherein a cat bed 70 supported by the shelf 56 may be in a position to receive direct sunlight. In another position, the shelves 56 may be swiveled or rotated adjacent the wall 62 in order to move the shelf 56 away from the window and allows for non-obstruction to operation of any window covering. Further still, in another position, the shelves 56 may be swiveled or rotated in a position between adjacent the window 60 and adjacent the wall 62. This allows a user to position the shelves in a position desired by the user. In some embodiments, the vertical support 52 may be sufficient to couple one shelf to the support arm 40. In other embodiments, the vertical support 52 may be sufficient to couple more than one shelf to the support arm 40. In these embodiments, multiple cat beds 70 may be mounted on various shelves 56 and oriented in different rotated configurations to allow a cat to climb to different height on the multiple cat beds 70.

Figure 17:
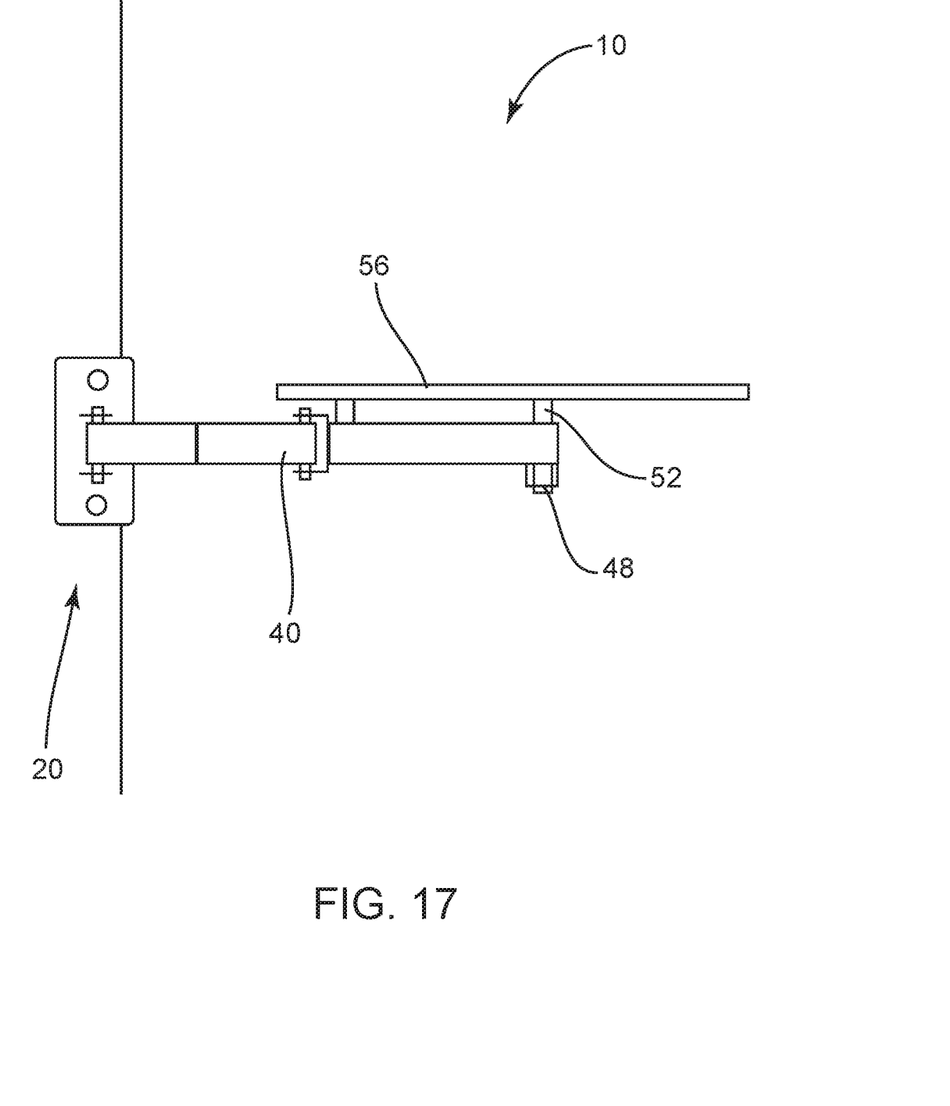
FIG. 17 is a perspective view of a swivel shelving system in accordance with embodiments.

Further, in some embodiments, as depicted in FIG. 17, a hook or loop may be attached to the swivel shelving system 10. In embodiments, the hook or loop may be coupled to a bottom end 48 of vertical support 52. This hook or loop may be utilized to hang an accessory, such as a plant, therefrom.

Accordingly, the components defining any swivel shelving system may be formed of any of many different types of materials or combinations thereof that can readily be formed into shaped objects provided that the components selected are consistent with the intended operation of a swivel shelving system. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any swivel shelving system may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A swivel shelving system comprising:
 a mounting bracket coupled to a corner between a wall and a window, wherein the mounting bracket is configured to couple to the corner between the wall and the window on a right side or a left side of the window;
 a support arm rotatably coupled to the mounting bracket, wherein the support arm further comprises a base portion and a telescopic portion, wherein the telescopic portion slides over an end of the base portion opposing an end coupled to mounting bracket; and
 a shelving assembly rotatably coupled to the support arm, wherein the shelving assembly is rotatable between a first position adjacent the window and a second position adjacent the wall.

2. The system of claim 1, wherein the shelving assembly comprises a vertical support and at least one shelf coupled to the vertical support.

3. The system of claim 2, wherein the vertical support of the shelving assembly is coupled to the support arm.

4. The system of claim 2, wherein the shelving system further comprises a shelf support coupled to the vertical support and is coupled to and supports the at least one shelf.

5. The system of claim 1, wherein the telescopic portion is slid over the base portion and secured in place with a shelf oriented up when the mounting bracket is coupled on the right side or left side of the window.

6. The system of claim 1, wherein the shelving assembly comprises a cat bed.

7. The system of claim 1, wherein the shelving assembly comprises a hook for hanging a plant therefrom.

8. A swivel shelving system comprising:
 a mounting bracket coupled to a corner between a wall and a window, wherein the mounting bracket is configured to couple to the corner between the wall and the window on a right side or a left side of the window;
 a support arm rotatably coupled to the mounting bracket, wherein the support arm further comprises a base portion and a telescopic portion, wherein the telescopic portion slides over an end of the base portion opposing an end coupled to mounting bracket; and
 a shelving assembly comprising a vertical support and at least one shelf coupled to the vertical support, therein the vertical support is rotatably coupled to the support arm, wherein the shelving assembly is rotatable between a first position adjacent the window and a second position adjacent the wall.

9. The system of claim 8, wherein the shelf is coupled directly to the vertical support.

10. The system of claim 8, wherein the shelving system further comprises a shelf support coupled to vertical support and is coupled to and supports the shelf.

11. The system of claim 8, wherein the telescopic portion is slid over the base portion and secured in place with a shelf oriented up when the mounting bracket is coupled on the right side or the left side of the window.

12. The system of claim 8, wherein the shelving assembly comprises a cat bed.

13. The system of claim 8, wherein the shelving assembly comprises a hook for hanging a plant therefrom.

14. A swivel shelving system comprising:
 a mounting bracket coupled to a corner between a wall and a window, the mounting bracket is configured to couple to the corner between the wall and the window on a right side or a left side of the window;
 a support arm rotatably coupled to the mounting bracket, the support arm comprising a base portion and a telescopic portion, wherein the telescopic portion slides over an end of the base portion opposing an end coupled to mounting bracket; and
 a shelving assembly comprising a vertical support and a plurality of shelves coupled to the vertical support, therein the vertical support is coupled to the support arm, wherein the plurality of shelves are independently rotatable between a first position adjacent a window and a second position adjacent the wall, wherein the telescopic portion of the support arm is slid over the base portion and secured in place with the shelf oriented up when the mounting bracket is coupled on the right side or the left side of the window.

15. The system of claim 14, wherein each said shelf is coupled directly to the vertical support.

16. The system of claim 14, wherein the shelving system further comprises a plurality of shelf supports, each said shelf support coupled to the vertical support and coupled to and supporting one said shelf of the plurality of shelves.

* * * * *